United States Patent [19]

Brahmbhatt

[11] Patent Number: 5,543,129
[45] Date of Patent: Aug. 6, 1996

[54] NON-CRYOGENIC METHOD AND APPARATUS FOR PRODUCING PURE NITROGEN

[75] Inventor: Sudhir R. Brahmbhatt, Glencoe, Mo.

[73] Assignee: MG Industries, Malvern, Pa.

[21] Appl. No.: 341,505

[22] Filed: Nov. 17, 1994

[51] Int. Cl.⁶ .................... C01B 21/00; B01J 8/00
[52] U.S. Cl. .................... 423/351; 95/122; 422/211
[58] Field of Search ................ 423/351; 95/122; 422/211

[56] References Cited

U.S. PATENT DOCUMENTS

| | | |
|---|---|---|
| 2,276,690 | 3/1942 | Germany .................... 423/351 |
| 2,944,627 | 7/1960 | Skarstrom .................... 95/122 |
| 3,335,546 | 8/1967 | Wunning .................... 95/122 |
| 4,065,355 | 12/1977 | Khouw et al. . |
| 4,197,095 | 4/1980 | White, Jr. et al. .................... 95/122 |
| 4,277,281 | 7/1981 | Weber et al. . |
| 4,473,559 | 9/1984 | Robinson . |
| 4,542,114 | 9/1985 | Hegarty . |
| 4,565,697 | 1/1986 | Ohmura et al. . |
| 4,752,002 | 6/1988 | Takahashi et al. . |
| 4,988,490 | 1/1991 | Nicholas et al. . |
| 5,090,971 | 2/1992 | Barbier . |
| 5,122,355 | 6/1992 | Prasad et al. . |
| 5,318,759 | 6/1994 | Campbell et al. . |

FOREIGN PATENT DOCUMENTS

| | | | |
|---|---|---|---|
| 117612 | 5/1987 | Japan .................... | 95/122 |
| 2053020 | 2/1981 | United Kingdom .................... | 95/122 |

Primary Examiner—Wayne Langel
Attorney, Agent, or Firm—William H. Eilberg

[57] ABSTRACT

A non-cryogenic system for producing ultra-pure nitrogen includes a pressure swing adsorption (PSA) unit for converting incoming ambient air into a process stream containing mainly nitrogen. The process stream is combined with hydrogen, in a reactor, to remove residual oxygen. The process stream is then cooled, and the cooled process stream is directed through a dryer. The output of the dryer is ultra-pure, dry nitrogen. The dryer contains at least two sections, one being the active section and the other section being regenerated. A portion of the output nitrogen leaving the active section is directed back into the section being regenerated, where it absorbs moisture, and is then recycled to the PSA unit. The result is an ultra-pure and dry product. The invention avoids the need for providing heat to the dryer, and also eliminates the need for many of the components used in prior art systems. The invention is economically operated even for small or medium-sized flow rates.

18 Claims, 1 Drawing Sheet

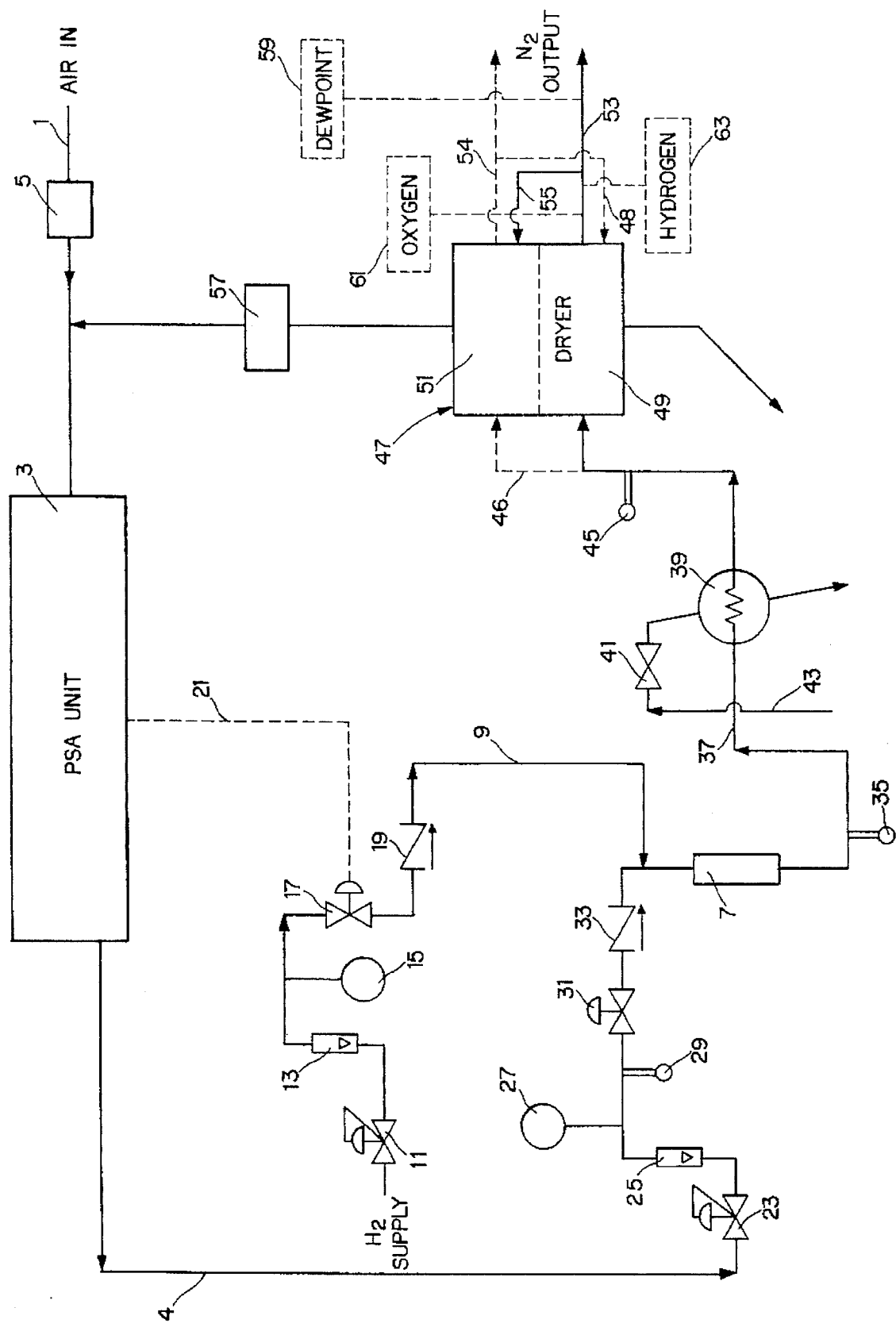

NON-CRYOGENIC METHOD AND APPARATUS FOR PRODUCING PURE NITROGEN

BACKGROUND OF THE INVENTION

This invention relates to the field of production of industrial gases. In particular, the invention includes a method and apparatus for producing ultra-pure gaseous nitrogen by non-cryogenic means.

Various industrial processes require the use of ultra-pure nitrogen, i.e. gaseous nitrogen having an oxygen content in the range of 1–5 parts per million (ppm), by volume. An example of such a process is a high-temperature heat treating furnace, wherein it is important to provide a substantially oxygen-free atmosphere. One way of providing ultra-pure nitrogen is to obtain and store it in liquid form, and to vaporize it immediately prior to use. Such a procedure yields nitrogen gas having an oxygen content of about 10 ppm or less, but requires equipment for storing and handling the cryogenic liquid which cannot be economically justified for small users.

It has also been known to provide nitrogen using a non-cryogenic process. In principle, one can obtain nitrogen directly from ambient air, simply by passing the air through a molecular sieve to remove most of the oxygen. This task is typically performed by a commercially-available device known as a pressure swing adsorption (PSA) nitrogen unit. In the PSA unit, incoming air is compressed and forced through a bed of molecular sieves which remove most of the oxygen from the air. The result is a product comprising mainly nitrogen, and having an oxygen content of about 1% by volume. One can obtain even better results from a PSA unit, but to do so requires significantly greater capital and operating costs. Alternatively, it is possible to remove most of the oxygen remaining in the stream exiting the PSA unit through the use of a deoxygenating device (also known as a "deoxo" unit).

Deoxygenating devices have been known in the prior art. Examples are described in U.S. Pat. Nos. 5,122,355 and 5,318,759. The latter patents discuss the use of catalysts to remove residual oxygen from the nitrogen stream. However, U.S. Pat. No. 5,318,759 produces a product which is not considered oxygen-free, and U.S. Pat. No. 5,122,355, while producing a pure product, requires either the expenditure of considerable energy, or requires the use of expensive equipment, or both. The disclosures of the above-cited patents are hereby incorporated by reference into this specification.

While it is possible to produce ultra-pure nitrogen using the systems of the prior art, such systems are usually not economical unless the production rate is at least about 10,000 scfh (standard cubic feet per hour). The systems of the prior art are expensive, both with respect to the energy needed to operate them, and with respect to the cost of the components and the piping and instrumentation connecting them. Such systems cannot justify themselves economically for smaller rates of production.

The present invention provides a method and apparatus for producing ultra-pure nitrogen, using a very cost-efficient non-cryogenic technique. The present invention is especially useful, and economically attractive, in applications which do not require large flow rates of nitrogen. In particular, the present invention provides an economical way of making ultra-pure nitrogen in systems requiring nitrogen at flow rates in the range of about 100 scfh to about 9000 scfh. The nitrogen produced by the present invention is substantially oxygen-free, having an oxygen content of less than 10 ppm by volume, and has a dew point of −70° F. or lower.

SUMMARY OF THE INVENTION

In the present invention, air enters a conventional pressure swing adsorption (PSA) unit, which contains its own compressor and a set of molecular sieves. The stream leaving the PSA unit comprises mainly gaseous nitrogen, and has an oxygen content of about 1% by volume. The oxygen in the process stream reacts catalytically with hydrogen to produce water. The process stream, which has become heated by the energy produced in the catalytic reaction, is first cooled and then passed to a dryer. The dryer operates without any outside source of heat, and uses a molecular sieve to remove moisture from the process stream.

The dryer includes at least two sections, one section being the active section and the other section being regenerated. The process stream flows through the active section, and is dried therein. Pure, dry nitrogen is then withdrawn from the active section of the dryer.

A portion of the dried nitrogen gas is recycled, as purge gas, through the section of the dryer being regenerated. The purge gas quickly picks up moisture trapped in the regenerating section of the dryer, and, with the aid of a compressor, is directed back to the PSA unit. The PSA unit itself has a built-in dryer which removes the moisture carried by the purge gas. Thus, the dry nitrogen used to regenerate the dryer is recycled and re-used, increasing the efficiency of the system.

The result is a system and method comprising a closed loop, in which a portion of the final product is used to regenerate the dryer, and is then recycled. In this system, no heat is applied to regenerate the dryer. The present invention therefore eliminates the need for heaters, heat exchangers, and auxiliary moisture separators. It is thus a more economical way of producing ultra-pure nitrogen than the techniques known in the prior art.

The present invention therefore has the primary object of providing a non-cryogenic method and apparatus for producing ultra-pure nitrogen.

The invention has the further object of substantially improving the efficiency and reducing the cost of making ultra-pure nitrogen.

The invention has the further object of producing ultra-pure nitrogen in a manner which is economical even for relatively low production rates.

The invention has the further object of producing gaseous nitrogen which is virtually free of oxygen and which is also very dry.

The reader will recognize other objects and advantages of the invention from a reading of the following brief description of the drawing, the detailed description of the invention, and the appended claims.

BRIEF DESCRIPTION OF THE DRAWING

The Figure provides a schematic diagram of the apparatus of the present invention.

DETAILED DESCRIPTION OF THE INVENTION

The Figure provides a schematic diagram of the apparatus made according to the present invention. Ambient air enters the system through line 1, and then flows to pressure swing adsorption (PSA) nitrogen unit 3. The PSA unit also includes a compressor 5 which is shown as an independent unit for clarity of illustration. The PSA unit includes a dryer and one or more molecular sieves which retain most of the oxygen in the air flowing through the sieves. The output of the PSA unit is therefore a gaseous stream, flowing in line 4, the stream comprising mostly nitrogen, and having an oxygen content of about 1% by volume.

The process stream then passes to reactor 7, in which oxygen in the process stream reacts with hydrogen to produce water. The hydrogen comes from supply line 9. The supply line 9 is connected to a cylinder or tank (not shown) or other suitable hydrogen storage means. The supply line 9 has pressure regulator valve 11, flow meter 13, pressure indicator 15, flow control valve 17, and check valve 19. The flow control valve 17 is preferably controlled by the PSA unit 3, as indicated by dotted line 21. The amount of hydrogen flowing through supply line 9 is determined by the amount of oxygen flowing out of the PSA unit. The PSA unit includes an oxygen sensor and a computer (not explicitly shown) for determining the amount of oxygen in the process stream and controlling valve 17 accordingly.

Line 4 also is connected to a pressure regulating valve 23, flow meter 25, pressure indicator 27, temperature indicator 29, manual shut-off valve 31, and check valve 33.

The reactor 7 is of conventional construction, and preferably includes a catalyst which supports the reaction of hydrogen with oxygen. This reaction is exothermic, so the process stream leaving the reactor is relatively hot. Temperature indicator 35 is used to monitor the temperature at the output of the reactor.

The process stream passes through line 37 to cooler 39. The cooler comprises a heat exchanger in which the process stream contacts one or more tubes containing cool water. Cooling water flows through supply line 43, from a water supply (not shown), through valve 41, and into the cooler. The cooling water then is drained as indicated by the arrow. The temperature of the process gas is substantially reduced in the cooler. This temperature can be monitored by temperature indicator 45.

The process stream then enters dryer 47. The dryer uses a molecular sieve to remove water from the process stream, and contains at least two sections, indicated by reference numerals 49 and 51. In the configuration shown in the drawing, section 49 is the active section, i.e. the section that is working to dry the process stream. Section 51 is the section that is being regenerated. The active section and the regenerating section are periodically alternated, so the process stream is alternately directed into one or the other of sections 49 and 51, while the non-active section is being regenerated. The Figure represents the situation in which section 49 is active and section 51 is being regenerated.

In the situation illustrated, the gas leaving section 49 of the dryer becomes the output stream 53. A portion of the output stream is fed, through line 55, to section 51 of the dryer, i.e. the section being regenerated, in the case illustrated. The gas entering section 51 is therefore the "purge" gas, because it purges the section being regenerated. In practice, line 55 may be wholly contained within the housing of the dryer. The dry nitrogen in line 55 is used to accomplish the regeneration, i.e. to absorb moisture from the molecular sieve, thereby freeing the sieve of moisture and enabling it to work again as a dryer. Because the nitrogen in line 55 is initially very dry, it rapidly and efficiently absorbs water, and quickly regenerates the molecular sieve. Compressor 57 provides suction which moves the purge gas, which now contains nitrogen and moisture, out of section 51 of the dryer. This purge gas is recycled to the PSA unit 3. As shown in the Figure, the recycled purge gas preferably enters the PSA unit downstream of the compressor 5. The recycled purge gas is dried in a dryer (not shown) which forms part of the PSA unit.

When the active and regenerating sections are reversed, the process stream enters the now active section 51 through line 46, and the product nitrogen is withdrawn through line 54. Line 48 conveys some of the output gas to the now regenerating section 49. The purge gas is then conveyed to the same conduit which leads to compressor 57 and back to the PSA unit.

Any or all of sensors 59, 61, and 63, which respectively measure the dew point, the oxygen content, and the hydrogen content of the output stream, can be optionally included, as indicated in dotted outline in the Figure.

EXAMPLE

In one example of the operation of the present invention, the flow rate was 500 scfh, and the pressure of the system was 60 psig. Higher or lower pressure could have been used. The PSA unit produced a process stream having an oxygen content of about 1% by volume.

The reactor accommodated a flow rate of 500 scfh. The reactor included a palladium catalyst on a substrate containing alumina. Reactors of this type are commercially available. It has been found that for every 0.1% of oxygen in the process stream, the reaction releases heat sufficient to raise the temperature of the process stream by about 40° F. Thus, a stream having an oxygen concentration of 1% will raise the temperature by about 400° F. The stream exiting the reactor had an oxygen content of less than 2 ppm.

The water cooler used cooling water having a temperature of about 55°–60° F., and was capable of cooling the process stream to about 70° F.

The dryer was a Balston dryer, Model No. 75–20. It was designed for a maximum inlet temperature of about 78° F. Thus, it was necessary to control the flow of water to the cooler to insure that the temperature of the process stream was not greater than 78° F. The final dew point of the dried product could be as low as −80° F.

Using the above-described components in the system of the present invention, it was possible to produce a nitrogen stream having extremely high purity and low dew point. In particular, the oxygen content of the product stream was usually 2 ppm or less, and the dew point of the product was −80° F. or lower.

It is an important aspect of the present invention that the process stream is not heated when it enters the dryer. Thus, with the present invention, there is no need for external heaters which undesirably consume energy. There is also no requirement for a heat exchanger to obtain heat from the reactor, as is done in U.S. Pat. No. 5,122,355. Instead, the dryer is operated without any heat. The gas used for regenerating the dryer is taken from the output stream, and is then re-used. Because it does not depend on the heat output of the oxygen-hydrogen reaction, the reliability of the present invention is enhanced.

Recycling of the nitrogen gas reduces the overall cost of operating the system, since virtually all nitrogen in the system is recovered and used productively.

The final product nitrogen, made according to the present invention, is of at least comparable quality to that produced by vaporizing a cryogenic liquid.

The invention can be modified in various ways. The specific instrumentation shown in the Figure can be varied; the arrangement of valves and indicators shown in the Figure is given as an example only, and should not be interpreted to limit the invention. The structure of the dryer can be changed; for example, the number of active and regenerating sections can be varied. These and other modifications will be apparent to those skilled in the art, and should be considered within the spirit and scope of the following claims.

What is claimed is:

1. Non-cryogenic apparatus for producing ultra-pure nitrogen, the apparatus comprising:
   a) means for receiving ambient air, the air including oxygen and nitrogen, and for producing a process stream comprising mostly nitrogen and the balance mainly oxygen,
   b) means for reacting the process stream with hydrogen, wherein the hydrogen combines with oxygen in the process stream to form water, the reacting means having an output,
   c) means for cooling the process stream, the cooling means being connected to the output of the reacting means, the cooling means having an output,
   d) means for drying the process stream, the drying means being connected to the output of the cooling means, the drying means including at least one active section and one regenerating section, the drying means having an output connected to the active section, the output providing a stream of ultra-pure nitrogen, the drying means being operable without a source of heat, and without receiving heat from the reacting means, and
   e) means for directing dry nitrogen from the output of the active section through the regenerating section, wherein the nitrogen flowing through the regenerating section absorbs water, and means for conveying said nitrogen that has absorbed water into the receiving means.

2. The apparatus of claim 1, wherein the receiving means includes first means for compressing incoming air.

3. The apparatus of claim 2, wherein the first compressing means has an upstream side and a downstream side, and wherein the conveying means is connected to the downstream side of the first compressing means.

4. The apparatus of claim 3, further comprising second compressing means connected between the drying means and the producing means.

5. The apparatus of claim 1, wherein the cooling means comprises means for contacting the process stream with a conduit containing cool water.

6. The apparatus of claim 1, further comprising means for converting the active section into a regenerating section, and for converting the regenerating section into an active section.

7. Non-cryogenic apparatus for producing ultra-pure nitrogen from a stream of air containing nitrogen and oxygen, the apparatus comprising:
   a) means for removing most of the oxygen from said stream of air to provide a process stream containing mostly nitrogen,
   b) means for reacting the process stream with hydrogen, wherein the hydrogen combines with oxygen in the process stream to form water, the reacting means having an output,
   c) means for cooling the process stream, the cooling means being connected to the output of the reacting means, the cooling means having an output,
   d) means for drying the process stream, the drying means being connected to the output of the cooling means, and means for withdrawing ultra-pure nitrogen from the drying means, the drying means being operable without a source of heat, and without receiving heat from the reacting-means,
      wherein the drying means includes an active section and a regenerating section, and wherein the apparatus includes means for directing ultra-pure nitrogen into the regenerating section and back to the removing means.

8. The apparatus of claim 7, further comprising compressing means connected between the drying means and the removing means.

9. The apparatus of claim 7, wherein the cooling means comprises means for contacting the process stream with a conduit containing cool water.

10. The apparatus of claim 7, further comprising means for converting the active section into a regenerating section, and for converting the regenerating section into an active section.

11. A non-cryogenic method of making ultra-pure nitrogen, the method comprising the steps of:
   a) receiving ambient air in a receiving means, the air including oxygen and nitrogen, and producing a process stream comprising mostly nitrogen, with most of the balance being oxygen,
   b) reacting the process stream with hydrogen, wherein the hydrogen combines with oxygen in the process stream to form water,
   c) cooling the process stream following the reacting step,
   d) drying the process stream, following the cooling step, in a dryer having an active section and a regenerating section, the active section of the dryer having an output from which pure, dry nitrogen is withdrawn, the drying step being performed without heating the process stream and without using heat produced in the reacting step,
   e) periodically directing dry nitrogen, without heating the dry nitrogen, from the output of the active section of the dryer into the regenerating section of the dryer, such that the dry nitrogen absorbs water, and
   f) returning nitrogen from the regenerating section to the receiving means, such that the nitrogen directed through the regenerating section is returned to the process stream.

12. The method of claim 11, wherein the producing step includes the step of compressing the ambient air.

13. The method of claim 11, wherein the returning step also includes the step of directing the nitrogen through a compressor before returning it to the process stream.

14. The method of claim 11, wherein the cooling step comprises the step of contacting the process stream with a conduit containing cool water.

15. The method of claim 11, further comprising the step of periodically changing the active section into a regenerating section, and changing the regenerating section into an active section.

16. A non-cryogenic method of making ultra-pure nitrogen, the method comprising the steps of:
   a) converting a stream of ambient air, in a converting means, into a process stream containing mainly nitrogen with most of the balance oxygen,
   b) reacting the process stream with hydrogen, wherein the hydrogen combines with oxygen in the process stream to form water, c) cooling the process stream following the reacting step, d) drying the process stream, following the cooling step, in a dryer having an active section and a regenerating section, the active section of the dryer having an output from which pure, dry nitrogen is withdrawn, the drying step being performed without heating the process stream and without using heat produced in the reacting step, and e) recycling a portion of the pure dry nitrogen withdrawn from the output of the dryer, without heating the dry nitrogen, through the regenerating section of the dryer and back to the converting means.

17. The method of claim 16, wherein the recycling step also includes the step of directing the nitrogen through a compressor before returning it to the converting means.

18. The method of claim 16, further comprising the step of periodically changing the active section into a regenerating section, and changing the regenerating section into an active section.

* * * * *